United States Patent
Yamashita et al.

(10) Patent No.: US 9,752,302 B2
(45) Date of Patent: Sep. 5, 2017

(54) WORKING MACHINE

(71) Applicant: KUBOTA CORPORATION, Osaka (JP)

(72) Inventors: Yuji Yamashita, Osaka (JP); Ryohei Sumiyoshi, Osaka (JP); Satoshi Tajima, Osaka (JP); Kunihiro Suzuki, Osaka (JP); Hayato Kawano, Osaka (JP); Hiroyuki Anami, Osaka (JP); Hajime Tamaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/862,486

(22) Filed: Sep. 23, 2015

(65) Prior Publication Data

US 2016/0090712 A1 Mar. 31, 2016

(30) Foreign Application Priority Data

Sep. 30, 2014 (JP) ................................ 2014-202390
Sep. 30, 2014 (JP) ................................ 2014-202391

(51) Int. Cl.
E02F 9/08 (2006.01)
B60K 11/04 (2006.01)
E02F 3/34 (2006.01)

(52) U.S. Cl.
CPC ............ *E02F 9/0866* (2013.01); *B60K 11/04* (2013.01); *E02F 3/3414* (2013.01); *B60Y 2200/415* (2013.01)

(58) Field of Classification Search
CPC ..... E02F 9/0866; E02F 9/0891; E02F 3/3414; B60K 11/02; B60K 11/04; B60K 11/06; B60K 11/08
See application file for complete search history.

(56) References Cited

U.S. PATENT DOCUMENTS

| 4,962,825 A * | 10/1990 | Albright ............... | B60K 11/00 180/292 |
| 6,092,616 A * | 7/2000 | Burris .................... | B60K 11/04 180/68.1 |
| 2003/0168269 A1* | 9/2003 | Pfusterschmid ....... | B60K 11/04 180/68.4 |
| 2008/0035404 A1* | 2/2008 | Dahl ..................... | A01B 51/026 180/233 |
| 2008/0283214 A1* | 11/2008 | Starkey .................. | B60K 11/04 165/41 |

(Continued)

FOREIGN PATENT DOCUMENTS

JP 8-113043 5/1996
JP 2013-104310 5/2013

*Primary Examiner* — Frank Vanaman
(74) *Attorney, Agent, or Firm* — Greenblum & Bernstein, P.L.C.

(57) ABSTRACT

A working machine includes: a motor; a fan arranged above the motor, the fan being configured to generate an air flow downward; a radiator arranged above the fan; and an oil cooler arranged adjacent to the radiator. In addition, the working machine includes: a shroud disposed around fan, the shroud including: a rim portion forming an air vent hole, the air vent hole being for passage of the air flow generated by the fan; and a support member attached to an upper portion of the shroud, the support member being configured to support the radiator and the oil cooler.

12 Claims, 14 Drawing Sheets

(56) References Cited

U.S. PATENT DOCUMENTS

2009/0194352 A1* 8/2009 Plante .................... B60K 11/04
                                                   180/294
2011/0088637 A1* 4/2011 Hirasawa ............... B60K 11/04
                                                   123/41.31

* cited by examiner

Fig.11
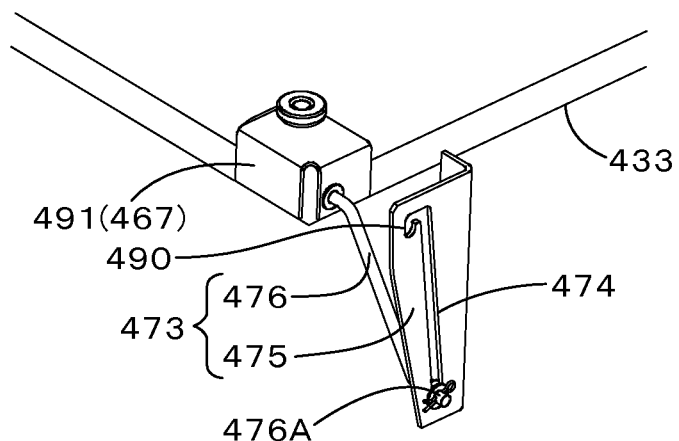
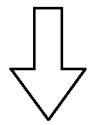
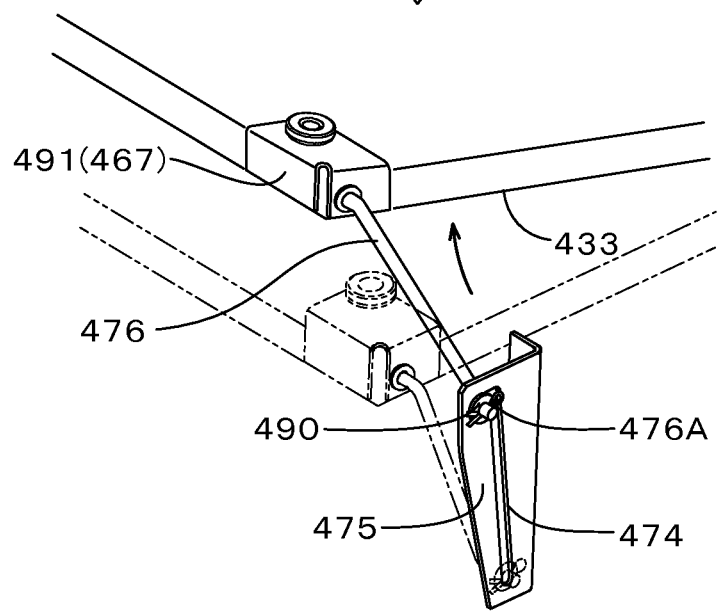

WORKING MACHINE

CROSS-REFERENCE TO RELATED APPLICATIONS

The present application claims priority under 35 U.S.C. §119 to Japanese Patent Application No. 2014-202390, filed Sep. 30, 2014 and to Japanese Patent Application No. 2014-202391, filed Sep. 30, 2014. The contents of this application are incorporated herein by reference in their entirety.

BACKGROUND OF THE INVENTION

Field of the Invention

The present invention relates to a working machine such as a skid steer loader, a track loader, and a compact track loader.

Description of Related Art

There has been a working machine having a configuration where a radiator, an oil cooler, and a condenser are arranged in the order of description from behind, in front of an engine (a motor) and inside a bonnet (an engine hood). The working machine are previously known (for example, refer to Japanese Unexamined Patent Application Publication No. H08-113043). In addition, there has been a working machine having a configuration where a radiator, an oil cooler, and a condenser are arranged in the order of description from below and above an engine (a motor). The working machine are also previously known.

In addition, there has been a working machine having: a fan; a shroud; and a support member, the fan being configured to cool an engine (a motor), the shroud surrounding a circumference of the fan to rectify a flow of cooling air, the support member being configured to support a fan motor for driving the fan. The working machine are previously known (for example, refer to Japanese Unexamined Patent Application Publication No. 2013-104310).

In the technique disclosed in Japanese Unexamined Patent Application Publication No. 2013-104310, a support member configured to support a motor fan includes: a motor attachment portion; and a fixation portion, the motor attachment portion being configured to accept attachment of the fan motor and horizontally extending to stride over a housing frame for housing a heat exchanger, the fixation member extending from both end portions of the motor attachment portion toward the housing frame and being attached to the housing frame. In such configuration, the motor attachment portion of the support member interferes with access from a side of the fan motor to cooling devices (a radiator, an oil cooler, and the like), the cooling devices being disposed on the fan and on an upper stream side of the fan. The configuration makes a maintenance work for the cooling devices hard.

BRIEF SUMMARY OF THE INVENTION

Problems to be Solved by the Invention

However, in the above-mentioned arrangement and configuration, the air generated by driving the fan for cooling the engine (the motor) flows toward the radiator through the condenser and the oil cooler. Thus, the air passes through the condenser and the oil cooler to be warmed. The warmed air is used for cooling the radiator, thereby degrading the heat exchange efficiency of the radiator. In addition, the air flowing toward the radiator is blocked when only one of the condenser and the oil cooler is clogged up, and accordingly the heat exchange efficiency of the radiator is further degraded.

To solve the above mentioned problems, the present invention intends to provide a working machine capable of improving the heat exchange efficiency of the radiator and of suppressing degradation of performance of the radiator even when the oil cooler is clogged up, in the working machine arranging the radiator and the oil cooler above the engine (the motor).

To solve the above mentioned problems, the present invention intends to provide a working machine, the working machine allowing easy access from a side of the fan motor to the cooling device disposed on the fan and on an upper stream side of the fan, and thus the working machine making a maintenance work for the cooling devices easy.

Means of Solving the Problems

To solve the above-mentioned technical problems, techniques that the present invention provides are characterized in the following points.

In a first aspect of the present invention, a working machine includes: a machine body; a motor mounted on the machine body; a fan arranged above the motor, the fan being configured to generate an air flow downward from above; a radiator arranged above the fan; and an oil cooler arranged in parallel to the radiator.

In a second aspect of the present invention, the working machine according to the first aspect of the present invention, includes: a shroud disposed around the fan, the shroud including: a rim portion forming an air vent hole, the air vent hole serving as a passage of the air flow generated by the fan; and a support member attached to an upper portion of the shroud, the support member being configured to support the radiator and the oil cooler.

In a third aspect of the present invention, the working machine according to the first aspect of the present invention, includes: a condenser arranged above the radiator and the oil cooler.

In a fourth aspect of the present invention, the working machine according to the third aspect of the present invention, includes: a stay member being configured to stay the condenser at a tilted-up position where the condenser is tilted upward from upper surfaces of the radiator and the oil cooler.

In a fifth aspect of the present invention, the working machine according to the fourth aspect of the present invention, wherein the stay member includes: a first bracket disposed around the condenser; a second bracket disposed around the condenser, the second bracket being different from the first bracket; a shaft portion disposed between the first bracket and the second bracket; a frame body configured to support the condenser; a joint portion attached to a front portion side of the frame body and connected to the shaft portion; and a stay portion configured to stay the condenser at the tilted-up position, the condenser being tilted by the joint portion turned centering about the shaft portion.

In a sixth aspect of the present invention, the working machine according to the fifth aspect of the present invention, wherein the first bracket is disposed on a front portion of the shroud in front of the condenser, the second bracket is disposed on a side portion of the shroud, the side portion being on a side of the condenser, and the stay member is disposed on a side portion of the shroud, the side portion being in rear of the second bracket.

In a seventh aspect of the present invention, the working machine according to the third aspect of the present invention, includes: a hose connected to the condenser, wherein the shroud includes: a rim portion forming a through hole on a side of the condenser, the through hole vertically penetrating the shroud, and the hose is disposed passing through the rim portion from below of the condenser and extending to reach an upper portion where the condenser is arranged.

To solve the above-mentioned technical problems, techniques that the present invention provides are characterized in the following points.

In an eighth aspect of the present invention, a working machine includes: a machine body; a motor disposed on a rear portion of the machine body; a fan disposed above the motor; a fan motor configured to drive the fan; a shroud disposed around the fan, the shroud including: a first rim portion forming an air vent hole, the air vent hole serving as a passage of an air flow generated by the fan; and a support member configured to support the fan motor from below, the support member including: an attachment portion being a portion for attachment of the fan motor; and a support stay extending from the attachment portion toward the shroud and being fixed at an end portion of the support stay, the end portion being disposed opposite to the attachment portion.

In a ninth aspect of the present invention, the working machine according to the eighth aspect of the present invention, comprises: a duct connected to the shroud, the duct being configured to introduce an air, the air passing through the air vent hole, wherein the duct including: a second rim portion forming an access hole; a cover configured to cover the access hole from an outside, the cover being configured to be freely attached to and detached from the access hole; and a third rom portion forming an opening portion, the opening portion being configured to exhaust the air to the outside.

In a tenth aspect of the present invention, the working machine according to the ninth aspect of the present invention, includes: a bonnet disposed to cover a rear portion of the motor, the bonnet being configured to be freely opened and closed, wherein the second rim portion is disposed on a rear portion of the duct.

In an eleventh aspect of the present invention, the working machine according to the ninth aspect of the present invention, wherein the fan motor is constituted of a hydraulic motor, the hydraulic motor being configured to be driven by a hydraulic operation fluid.

In an twelfth aspect of the present invention, the working machine according to the eleventh aspect of the present invention, comprises: a first hydraulic hose configured to supply the hydraulic operation fluid to the hydraulic motor, the hydraulic hose passing through the third rim portion and entering the duct; and a relay portion configured to connect an end portion of the hydraulic hose to a second hydraulic hose other than the first hydraulic hose, the end portion being disposed on a side opposite to another end portion entering the duct.

In a thirteenth aspect of the present invention, the working machine according to the twelfth aspect of the present invention, wherein the relay portion is disposed on a side of the third rim portion.

In a fourteenth aspect of the present invention, the working machine according to the ninth aspect of the present invention, wherein one of the third rim portions is disposed on a right side of the machine body, and the other one of the third rim portions is disposed on a left side of the machine body.

In a fifteenth aspect of the present invention, the working machine according to the eighth aspect of the present invention, includes: a motor room configured to house the motor, wherein the shroud includes: a plate portion having the first rim portion; and a standing portion standing upward from a circumference of the plate portion, and the standing portion includes: an opening rim portion forming an air inlet, the air inlet being configured to take air from the motor room.

In a sixteenth aspect of the present invention, the working machine according to the fifteenth aspect of the present invention, includes: a radiator disposed in rear of the standing portion, the radiator having a circumference portion; and a guide member disposed between the standing portion and the circumference portion, the guide member being configured to guide the air, the air passing through the opening rim portion.

In a seventeenth aspect of the present invention, the working machine according to the sixteenth aspect of the present invention, wherein the guide member includes: a first guide portion arranged above the opening rim portion and on a position higher than an upper end of the standing portion; and a second guide portion arranged below the opening rim portion.

Effects of the Invention

A working machine according to the present invention includes: a machine body; a motor mounted on the machine body; a fan arranged above the motor, the fan being configured to generate an air flow downward from above; a radiator arranged above the fan; and an oil cooler arranged in parallel to the radiator. Accordingly, the air of relatively-low temperature is used for cooling the radiator, the air not passing through the oil cooler, thereby improving the heat exchange efficiency of the radiator. In addition, since the air not passing through the oil cooler can be introduced to the radiator, the degradation of the heat exchange efficiency of the radiator can be suppressed, the degradation of the heat exchange efficiency being caused by the clogging up of the oil cooler.

A working machine according to the present invention includes: a machine body; a motor disposed on a rear portion of the machine body; a fan disposed above the motor; a fan motor configured to drive the fan; a shroud disposed around the fan, the shroud including: a first rim portion forming an air vent hole, the air vent hole being for passage of an air flow generated by the fan; and a support member configured to support the fan motor from below, the support member including: an attachment portion being a portion for attachment of the fan motor; and a support stay extending from the attachment portion toward the shroud and being fixed at an end portion disposed opposite to the attachment portion. According to the above described configurations, the fan can be easily accessed from the side of the fan motor (from below), and the cooling unit also can be easily accessed through the air vent hole, the cooling unit being disposed on an upper stream side of the fan. In this manner, the configurations allow good working efficiency in the maintenance thereof.

BRIEF DESCRIPTION OF THE DRAWINGS

FIG. 11 is a schematic view explaining a motion of a stay rod according to the embodiment, the stay rod continuously moving when the condenser moves from a normal position to a tilted-up position;

DESCRIPTION OF THE EMBODIMENTS

Referring to drawings, an embodiment of the present invention will be described below.

Figure 13:
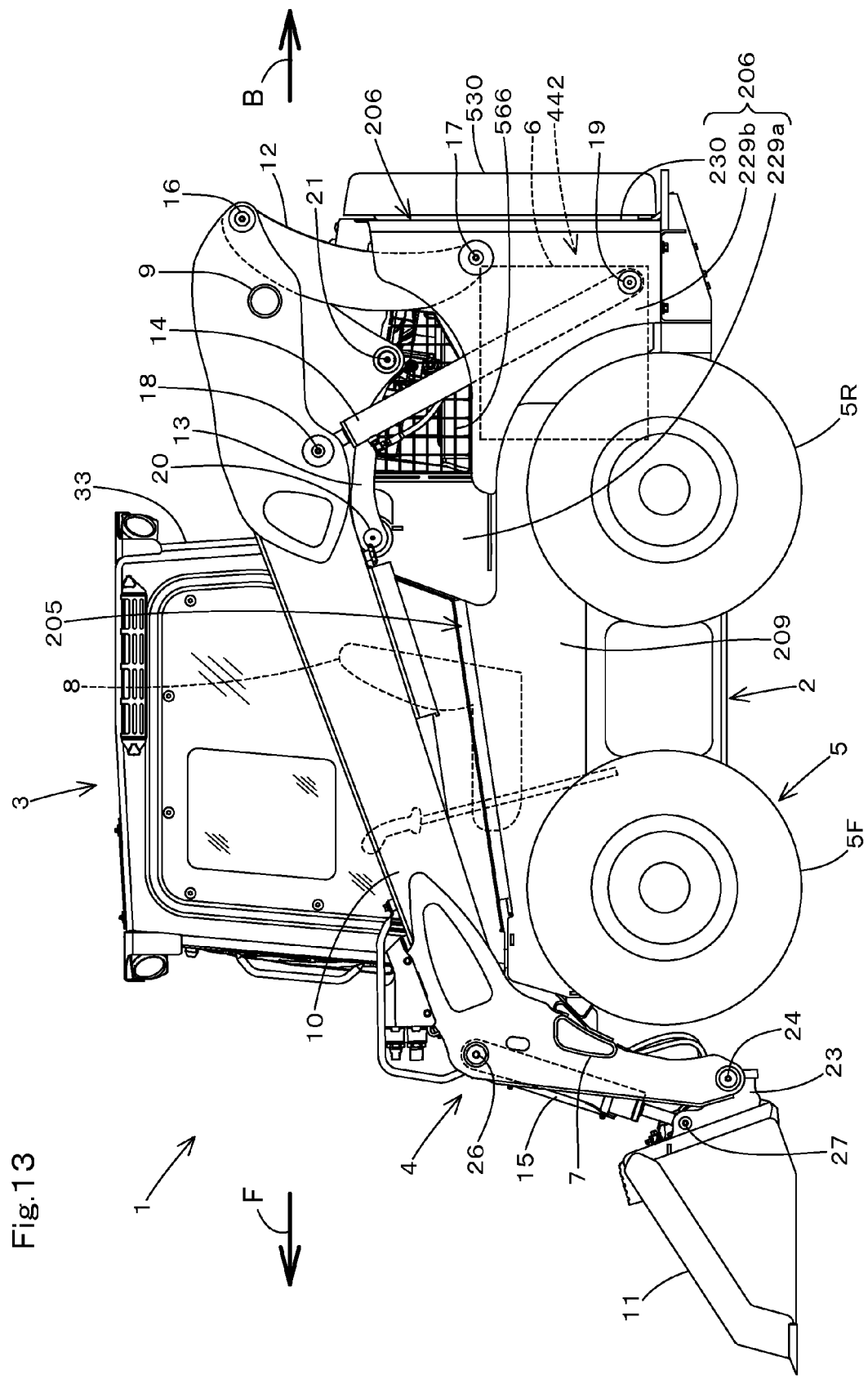
FIG. 13 is a side view of the working machine according to the embodiment.
Figure 14:
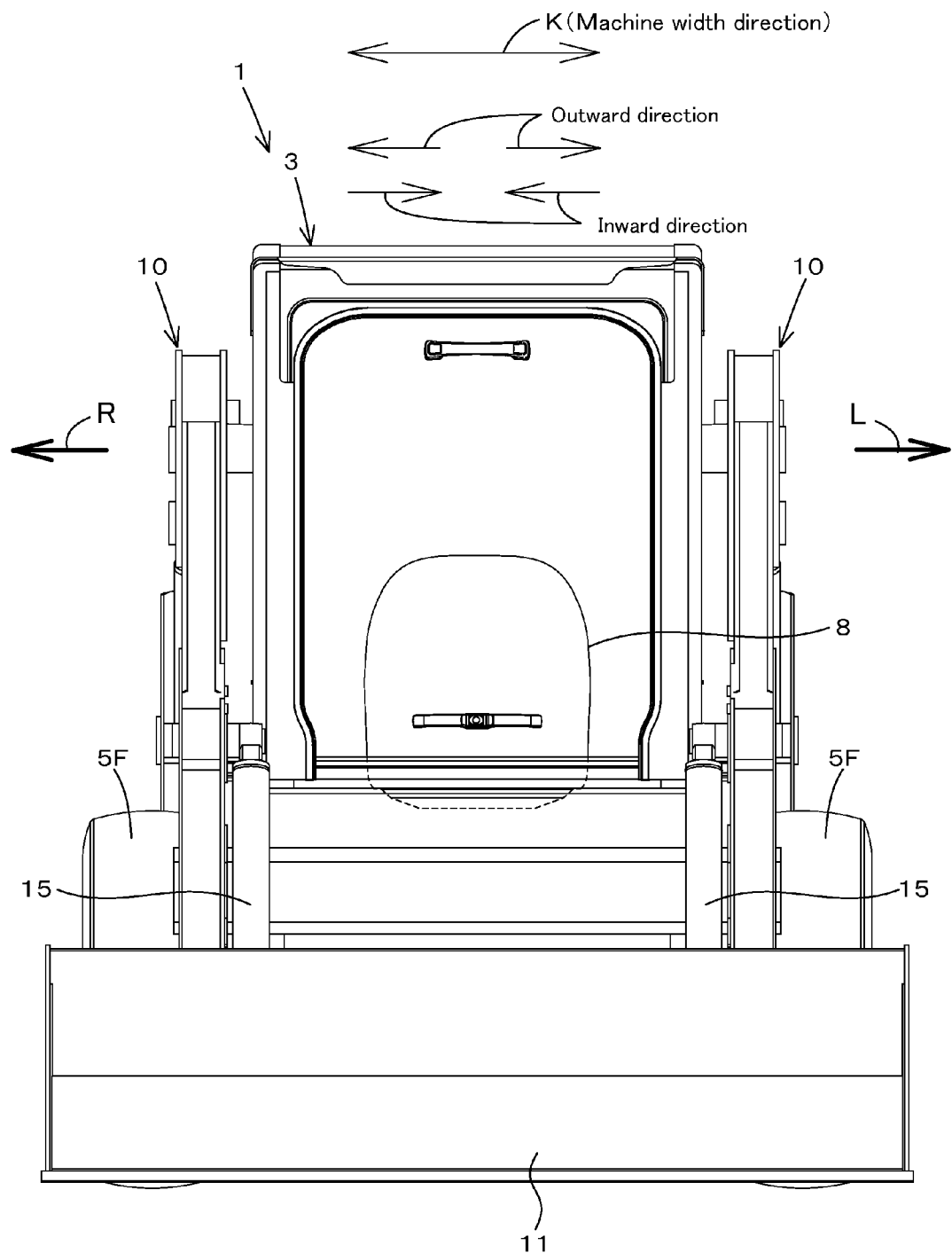
FIG. 14 is a front view of the working machine according to the embodiment.

FIG. 13 is a side view of a working machine according to an embodiment of the present invention. FIG. 14 is a front view of the working machine according to the embodiment of the present invention. FIG. 13 and FIG. 14 show a Skid Steer Loader (SSL) as an example of the working machine of the present invention. The working machine of the present invention is not limited to the Skid Steer Loader (SSL), and can be other types of the working machine, for example, a Track Loader (TL), a Compact Track Loader (CTL), and the like.

The skid steer loader 1 is the working machine according to the embodiment. The skid steer loader 1 includes a body 2 of the working machine (hereinafter referred to as a machine body 2), a cabin 3, an operation device 4, and travel devices 5. The cabin 3 is mounted on the machine body 2. The operation device 4 is attached on the machine body 2. The skid steer loader 1 includes two travel devices 5; one of the travel devices 5 is provided on a right side of the machine body 2, and the other one is provided on a left side of the machine body 2. A motor 6 is mounted on a rear portion of the machine body 2. An operator seat 8 is provided in the cabin 3. The motor 6 is an engine, an electric motor, and the like. The skid steer loader 1 according to the embodiment employs a diesel engine. Hereinafter, in explanations of the embodiment of the present invention and in explanations of the modified examples of the embodiment, a forward direction (a direction shown by an arrowed line F in FIG. 13) corresponds to a front side of an operator seating on the operator seat 8 of the skid steer loader 1, a backward direction (a direction shown by an arrowed line B in FIG. 13) corresponds to a back side of the operator, a leftward direction (a direction shown by an arrowed line L in FIG. 14) corresponds to a left side of the operator, and a rightward direction (a direction shown by an arrowed line R in FIG. 14) corresponds to a right side of the operator.

In addition, in explanations of the embodiment of the present invention and in explanations of the modified examples of the embodiment, a direction from the front side shown by the arrowed line F toward the back side shown by the arrowed line B (or a direction from the back side shown by the arrowed line B toward the front side shown by the arrowed line A) is referred to as a front to rear direction (or a rear to front direction), and a horizontal direction perpendicular to the front to rear direction (or the rear to front direction) is a direction K along a width of the machine body 2. The direction K along the width of the machine body 2 is hereinafter referred to as the machine width direction K. As shown in FIG. 14, in the following description, a direction from a center portion of the machine body 2 toward the above mentioned right side can be referred to as an outward direction. And, a direction from the center portion of the machine body 2 toward the above mentioned left side can be also referred to as the outward direction. The outward direction is hereinafter referred to as a machine outward direction. In other words, the machine outward direction corresponds to a direction departing from the center portion of the machine body 2 in the machine width direction K. A direction opposite to the machine outward direction can be referred to as an inward direction. The inward direction is hereinafter referred to as a machine inward direction. In other words, the machine inward direction corresponds to a direction toward the center portion of the machine body 2 in the machine width direction K.

As shown in FIG. 13 and FIG. 14, the operation device 4 includes booms 10, an operation tool 11, lift links 12, control links 13, boom cylinders 14, and bucket cylinders 15.

The operation device 4 includes two booms 10; one of the booms 10 is provided on a right side of the cabin 3 (referred to as the right boom 10) and is capable of freely swinging upward and downward, and the other one is provided on a left side of the cabin 3 (referred to as the left boom 10) and is capable of freely swinging upward and downward. The operation tool 11 is a bucket (hereinafter referred to as a bucket 11), for example. The bucket 11 is provided on tip portions (front end portions) of the booms 10 and is capable of freely swinging upward and downward. The lift link 12 and the control link 13 support a base portion (a rear portion) of the boom 10 so that the boom 10 is capable of freely swinging upward and downward. The boom cylinder 14 is capable of being stretched and shortened, thereby moving the boom 10 upward and downward. The bucket cylinder 15 is capable of being stretched and shortened, thereby swinging the bucket 11.

The operation device 4 includes a joint pipe 7 having a deformed shape, that is, the joint pipe 7 being a deformed pipe. The joint pipe 7 is connected to a front portion of the right boom 10 and to a front portion of the left boom 10 between the right boom 10 and the left boom 10, thereby jointing the right boom 10 and the left boom 10 with each other. The operation device 4 includes a joint pipe 9 having a cylindrical shape, that is, the joint pipe 9 being a cylindrical pipe. The joint pipe 9 is connected to a base portion (a rear portion) of the right boom 10 and to a base portion (a rear portion) of the left boom 10 between the right boom 10 and the left boom 10, thereby jointing the right boom 10 and the left boom 10 with each other. The operation device 4 includes two lift links 12, two control links 13, and two boom cylinders 14. One of the lift links 12 (the right lift link 12), one of the control links 13 (the right control link 13), and one of the boom cylinders 14 (the right boom cylinder 14) are provided on a right side of the machine body 2, corresponding to the right boom 10 (also referred to as the corresponding boom 10). And, the other one of the lift links 12 (the left lift link 12), the other one of the control links 13 (the left control link 13), and the other one of the boom cylinders 14 (the left boom cylinder 14) are provided on a left side of the machine body 2, corresponding to the left boom 10 (also referred to as the corresponding boom 10).

The lift link 12 is provided to be vertically arranged on a rear portion of the base portion of the boom 10. The lift link 12 is supported at an upper portion of the lift link 12 by a pivot shaft 16 (a first pivot shaft) to be capable of freely turning about a horizontal axis of the pivot shaft 16, the lift link 12 being supported on the rear portion of the base portion of the boom 10 by the pivot shaft 16. In addition, the lift link 12 is supported at a lower portion of the lift link 12 by a pivot shaft 17 (a second pivot shaft) to be capable of freely turning about a horizontal axis of the pivot shaft 17, the lift link 12 being supported on the rear portion of the machine body 2 by the pivot shaft 17. The second pivot shaft 17 is disposed lower than the first pivot shaft 16.

The boom cylinder 14 is supported at an upper portion of the boom cylinder 14 by a pivot shaft 18 (a third pivot shaft) to be capable of freely turning about a horizontal axis of the pivot shaft 18. The third pivot shaft 18 is disposed on the base portion of the boom 10 in front of the first pivot shaft 16. The boom cylinder 14 is supported at a lower portion of the boom cylinder 14 by a pivot shaft 19 (a fourth pivot shaft) to be capable of freely turning about a horizontal axis of the pivot shaft 19. The fourth pivot shaft 19 is disposed on a lower portion of the rear portion of the machine body 2, being lower than the third pivot shaft 18

The control link 13 is disposed in front of the lift link 12. One end of the control link 13 is supported by a pivot shaft 20 (a fifth pivot shaft) to be capable of freely turning about a horizontal axis of the pivot shaft 20. The fifth pivot shaft 20 is disposed on the machine body 2, that is, on a corresponding position in front of the lift link 12. The other end of the control link 13 is supported by a pivot shaft 21 (a sixth pivot shaft) to be capable of freely turning about a horizontal axis of the pivot shaft 21. The sixth pivot shaft 21 is disposed on the boom 10 in front of the second pivot shaft 17, being higher than the second pivot shaft 17.

Stretching and shortening of the boom cylinder 14 swing the boom 10 upward and downward about the first pivot shafts 16, the boom 10 being supported on the base portion of the boom 10 by the lift link 12 and the control link 13, thereby moving a tip portion of the boom 10 upward and downward. The control link 13 is swung upward and downward about the fifth pivot shaft 20 by the swinging upward and downward of the boom 10. The lift link 12 is swung forward and backward about the second pivot shaft 17 by the swinging upward and downward of the control link 13.

An attachment body 23 is pivotally supported on the front portions (the tip portions) of the booms 10. The bucket 11 is attached to the attachment body 23 and is capable of being freely attached and detached. The attachment body 23 is supported on the front portions of the booms 10 by a pivot pin 24, thereby being capable of freely turning about a horizontal axis of the pivot pin 24. Not only the bucket 11, other operation tools can be attached to the attachment body 23. The following attachments (spare attachments) are exemplified as the other operation tools; for example, a hydraulic crusher, a hydraulic breaker, an angle broom, an earth auger, a pallet fork, a sweeper, a mower, a snow blower, and the like.

The bucket cylinder 15 is arranged on the front portion of the boom 10. The bucket cylinder 15 is pivotally supported on the boom 10 by a first bucket cylinder pin 26 at an upper portion of the bucket cylinder 15, thereby being capable of freely turning about a horizontal axis of the first bucket cylinder pin 26. The bucket cylinder 15 is pivotally supported on the attachment body 23 by a second bucket cylinder pin 27 at a lower portion of the bucket cylinder 15, thereby being capable of freely turning about a horizontal axis of the second bucket cylinder pin 27. Stretching and shortening of the bucket cylinder 15 swing the bucket 11.

In the embodiment, both of the right travel device 5 and the left travel device 5 employ a wheeled travel device, the wheeled travel device having a front wheel 5F and a rear wheel 5R. However, a crawler travel device (including a semi-crawler travel device) may be employed as the travel device 5.

Next, a concrete configuration of the machine body 2 will be described below.

Figure 8:
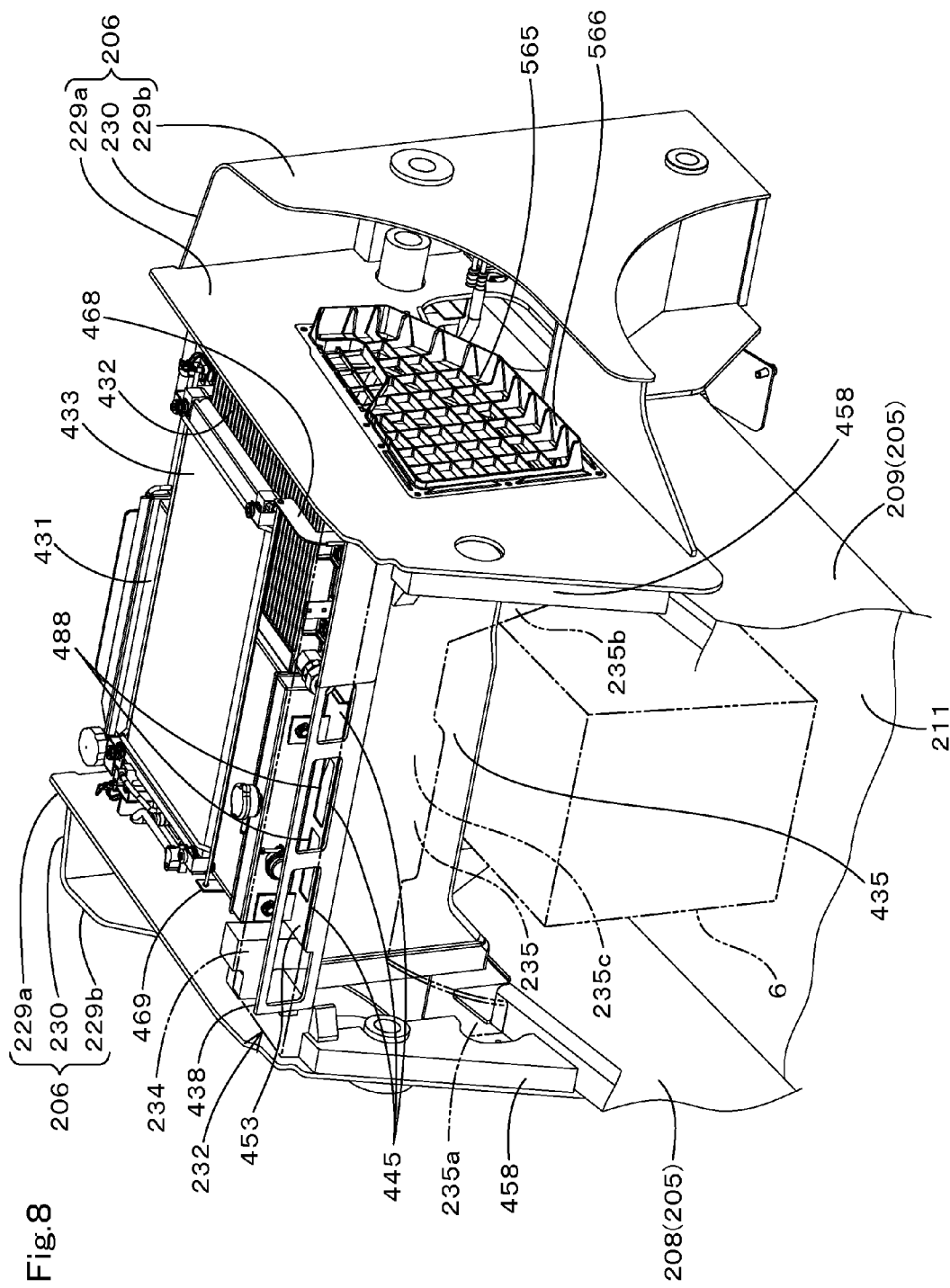
FIG. 8 is a perspective view of an area around the motor and the cooling unit according to the embodiment, seen downward and diagonally-rightward from ahead of the working machine.

As shown in FIG. 8 and FIG. 13, the machine body 2 includes a main frame 205 and support frames 206. The main frame 205 includes a right frame portion 208, a left frame portion 209, and a bottom frame portion 211. The right frame portion 208 constitutes a right portion of the machine body 2. The left frame portion 209 constitutes a left portion of the machine body 2. The bottom frame portion 211 constitutes a bottom portion of the machine body 2.

As shown in FIG. 13, one of the support frames 206 is disposed on a right side of a rear portion of the main frame 205, and the other one of the support frames 206 is disposed on a left side of the rear portion of the main frame 205. Each of the support frames 206 includes a right support frame and a left support frame, the right support frame being disposed on a right side of the right frame portion 208, the left support frame being disposed on a left side of the left frame portion 209.

As shown in FIG. 8 and FIG. 13, each of the support frames 206 (the right support frame and the left support frame) includes: a pair of support walls 229a and 229b; and a rear wall 230.

One of the support walls, the support wall 229a, is separated from the other one of the support walls, the support wall 229b, in a horizontal direction perpendicular to the front to rear direction (the machine width direction K). The support wall 229a and the support wall 229b are disposed to be opposite to each other. The rear wall 230 joints a rear end of the support wall 229a to a rear end of the support wall 229b.

Figure 7:
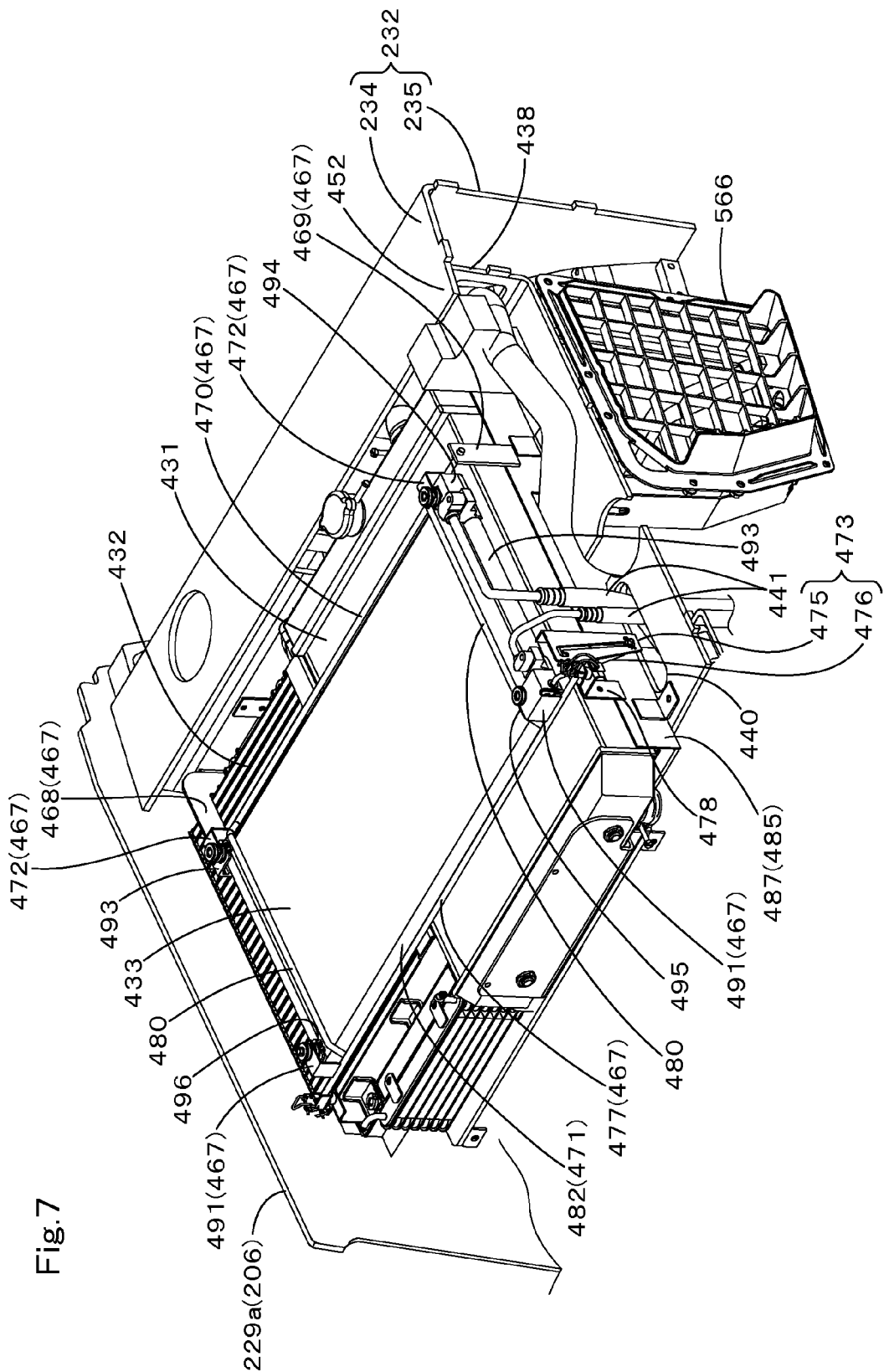
FIG. 7 is a perspective view of the area around the cooling unit according to the embodiment, seen downward and diagonally-leftward from behind the working machine.

As shown in FIG. 7, a front frame 232 is disposed between the support frames 206. The front frame 232 joints a front portion of one of the support walls 229a to a front portion of the other one of the support walls 229a, the support walls 229a being disposed inside. The front frame 232 includes an upper plate portion 234 and a front plate portion 235.

Figure 9:
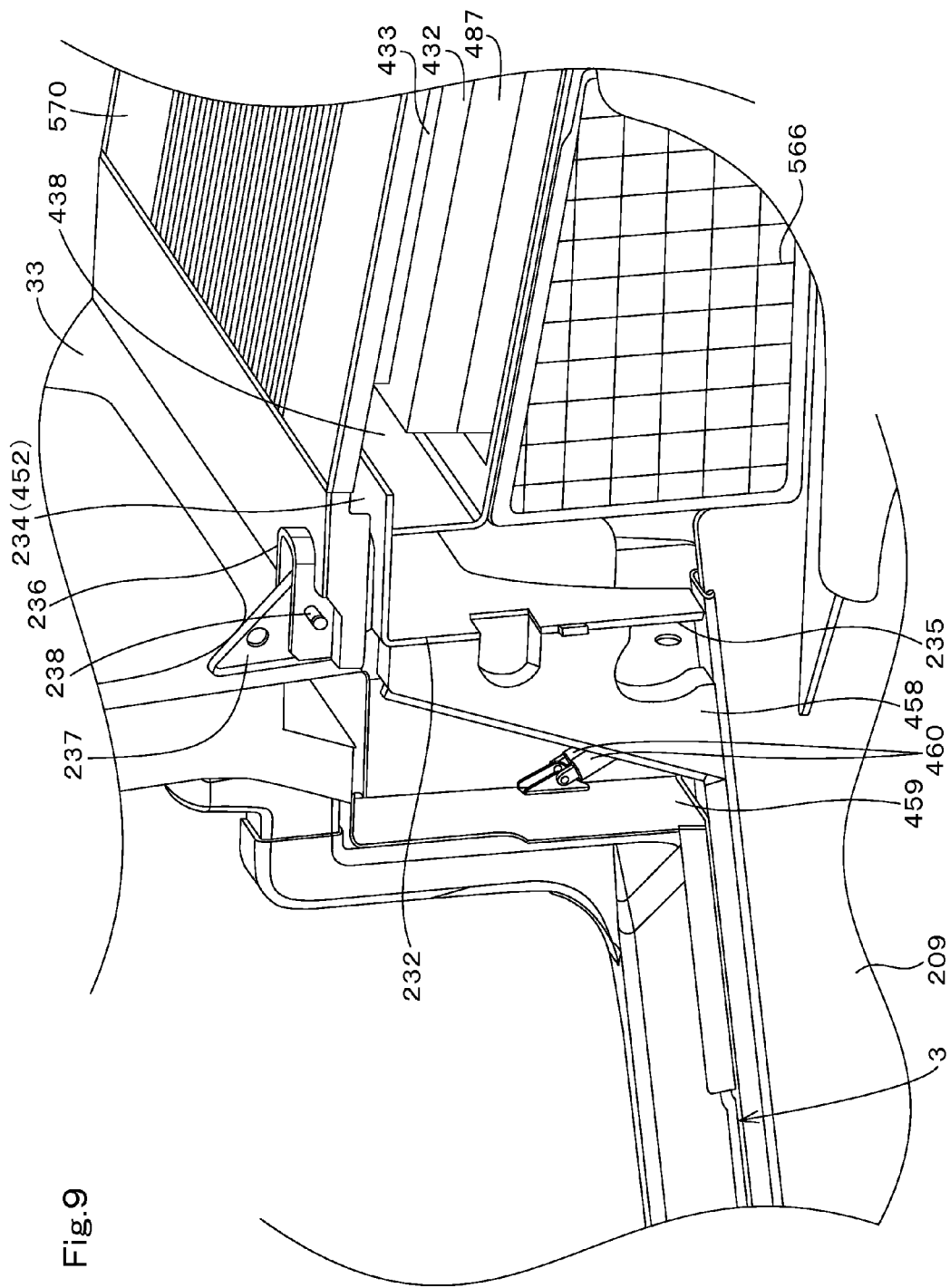
FIG. 9 is a perspective view of an area around a front of the cooling unit according to the embodiment, seen downward and diagonally-rightward from behind the working machine.

As shown in FIG. 7 to FIG. 9, the front plate portion 235 extends downward from a front end of the upper plate portion 234. As shown in FIG. 8, the front plate portion 235 includes a right portion 235a, a left portion 235b, and a center portion 235c. Additionally in FIG. 8, the front frame 232 is illustrated by a two-dot chain line (a virtual line) to show a second guide portion 453 and a standing portion 438 described later.

The right portion 235a extends downward from a right portion of the front end of the upper plate portion 234, and contacts to an upper surface of the right frame portion 208 of the machine body 2. The left portion 235b extends downward from a left portion of the front end of the upper plate portion 234, and contacts to an upper surface of the left frame portion 209 of the machine body 2. The center portion 235c extends downward from the left portion of the front end of the upper plate portion 234, and joints an upper portion of the right portion 235a to an upper portion of the left portion 235b.

A second support member 458 is disposed on an upper surface of the right frame portion 208. And, another second support member 458 is disposed on an upper surface of the left frame portion 209. The second support member 458 disposed on the right frame portion 208 is arranged in front of the right portion 235a of the front frame 232. The second support member 458 disposed on the left frame portion 209 is arranged in front of the left portion 235b of the front frame 232. The second support member 458 disposed on the right frame portion 208 contacts to a front surface of the right portion 235a. The second support member 458 disposed on the left frame portion 209 contacts to a front surface of the left portion 235b. A lower portion 459 of a back surface (a back surface lower portion 459) is arranged in front of the second support members 458, the back surface lower portion 459 being included in the cabin 3.

As shown in FIG. 9, machine body side brackets 236 are disposed on an upper surface of the upper plate portion 234 of the front frame 232. One of the machine body side brackets 236 is disposed on the right portion of the machine body 2, the other one of the machine body side brackets 236 is disposed on the left portion of the machine body 2, and thereby a pivot shaft 238 is supported by the machine body side brackets 236 to be capable of freely turning. The pivot shaft 238 is attached to a cabin side bracket 237, the cabin side bracket 237 being disposed on a lower end portion of a back surface (a back surface lower end portion) of a rear panel 33 of the cabin 3.

The back surface lower portion 459 of the cabin 3 is arranged in front of the second support member 458. End portions of two gas springs 460 are connected to the back surface lower portion 459. The other end portions (not shown in the drawings) of the gas springs 460 are each connected to a lower portion of the machine body 2. Stretching of the gas springs 460 lifts up the cabin 3, turning the cabin 3 centering about the pivot shaft 238.

Figure 2:
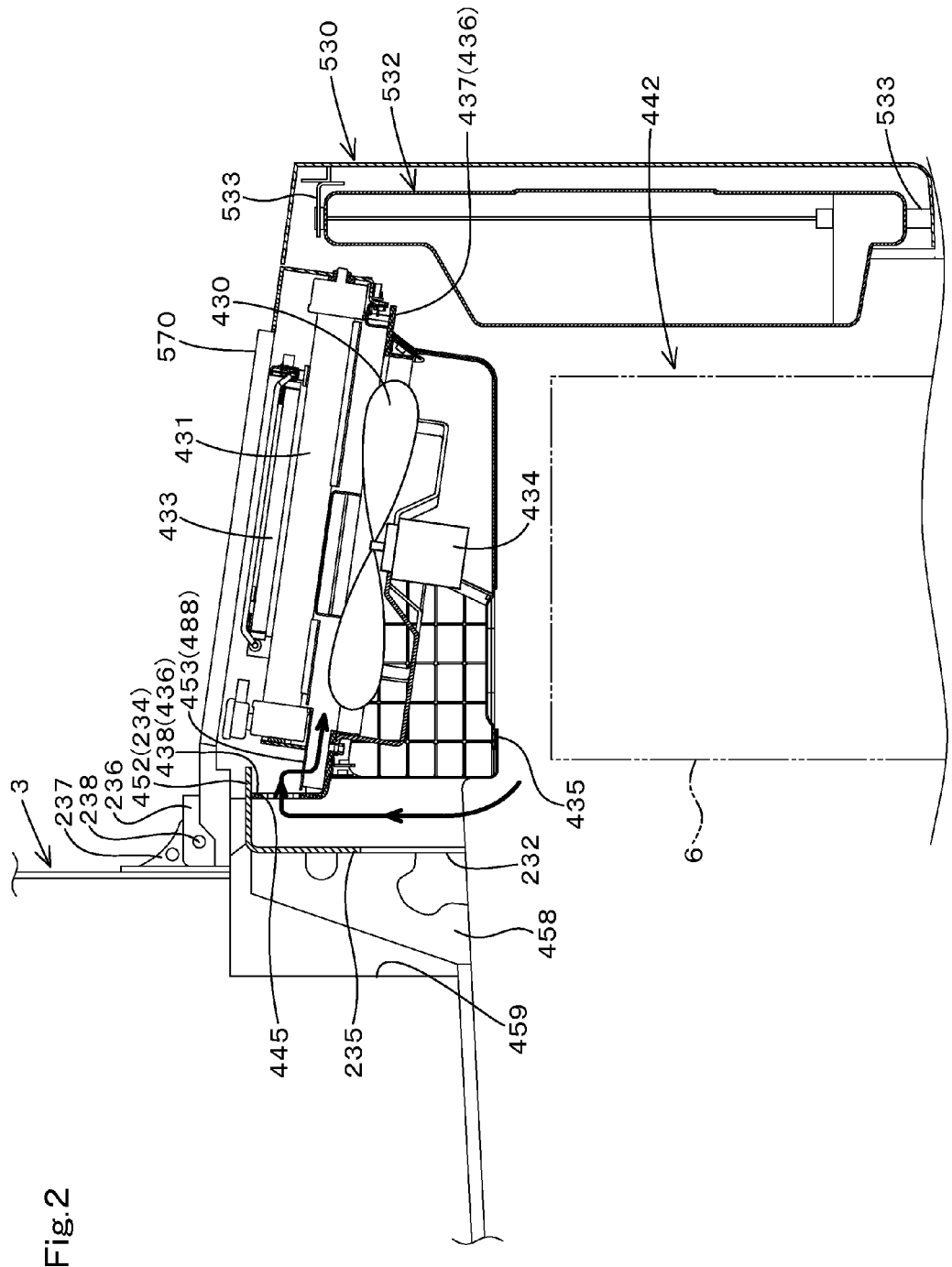
FIG. 2 is a schematic side cross-sectional view of a main portion of a rear portion of a working machine according to the embodiment.

As shown in FIG. 2 and FIG. 13, the rear portion of the machine body 2 includes an engine room (a motor room) 442 and a bonnet (a rear bonnet) 530, the engine room 442 being configured to house the engine (the motor) 6, the bonnet 530 being configured to cover a rear portion of the engine room 442.

As shown in FIG. 2, a tank 532 is disposed in a rear portion of the engine room 442, in particular, the tank 532 is disposed between the engine 6 and the bonnet 530, the tank 532 being configured to store fuel. The tank 532 is supported on a front surface of the bonnet 530 by a support member 533.

Figure 1:
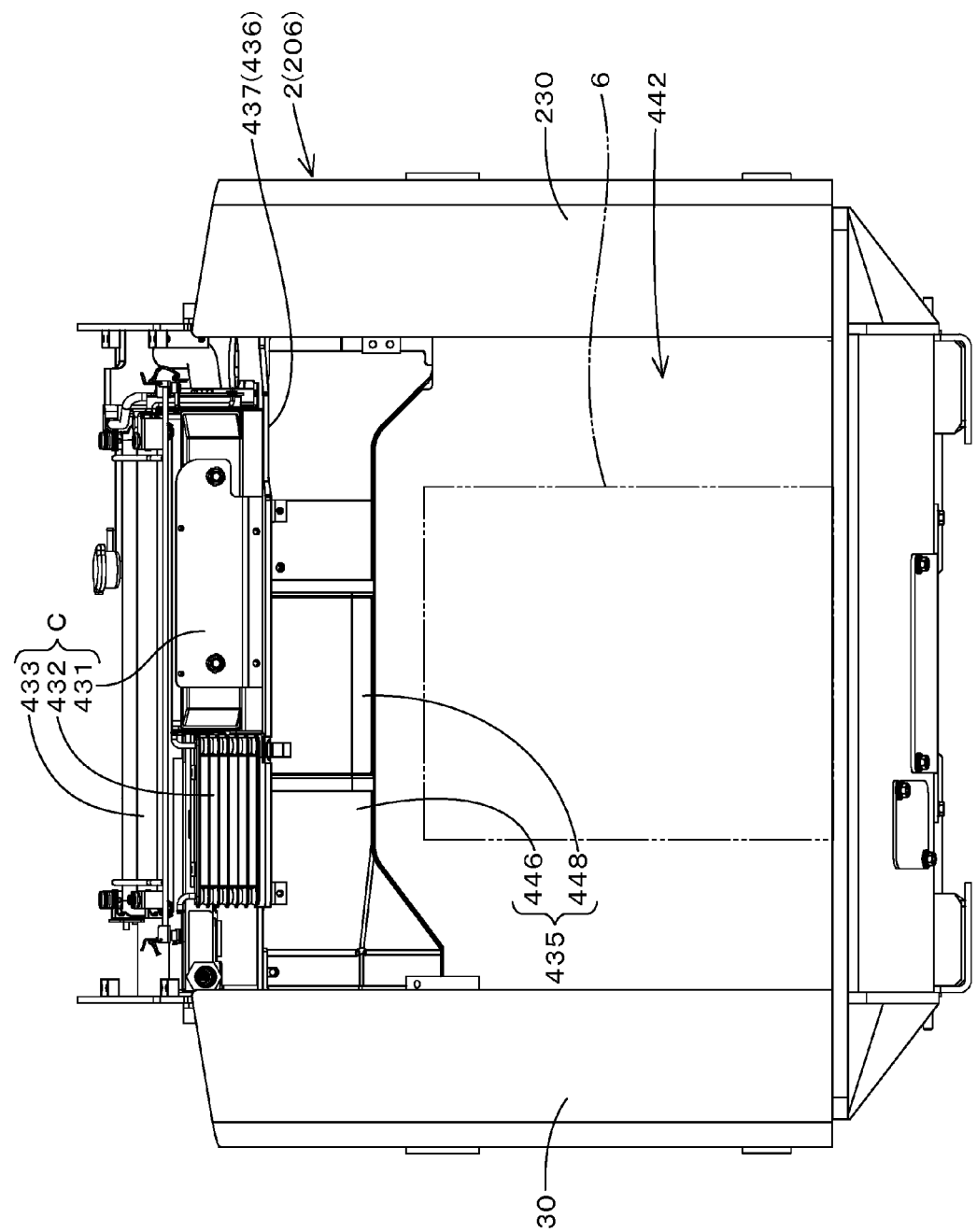
FIG. 1 is a schematic back view showing a positional relation between a motor and a cooling unit according to an embodiment of the present invention.

As shown in FIG. 1 and FIG. 2, a duct 435 is arranged above the engine room 442, that is, above the engine 6. A fan 430 is disposed inside the duct 435, the fan 430 being configured to cool the engine 6. A radiator 431, an oil cooler 432, and a condenser 433 are arranged above the duct 435. Hereinafter, the radiator 431, the oil cooler 432, and the condenser 433 may be referred to collectively as a cooling unit C.

The radiator 431 cools the cooling water (coolant) supplied to the engine 6. The oil cooler 432 cools the hydraulic operation fluid. The condenser 433 condenses the cooling medium (refrigerant) of an air conditioner (not shown in the drawings) arranged inside the cabin 3.

As shown in FIG. 2 to FIG. 5, a fan motor 434 is arranged under the fan 430. The fan motor 434 is a hydraulic motor configured to be operated by the hydraulic operation fluid. A revolution shaft of the fan motor 434 vertically extends in the duct 435. The fan 430 is connected to an upper end of the revolution shaft. The fan 430 is driven to revolve by the fan motor 434, thereby generating an air flow downward from above.

Figure 5:
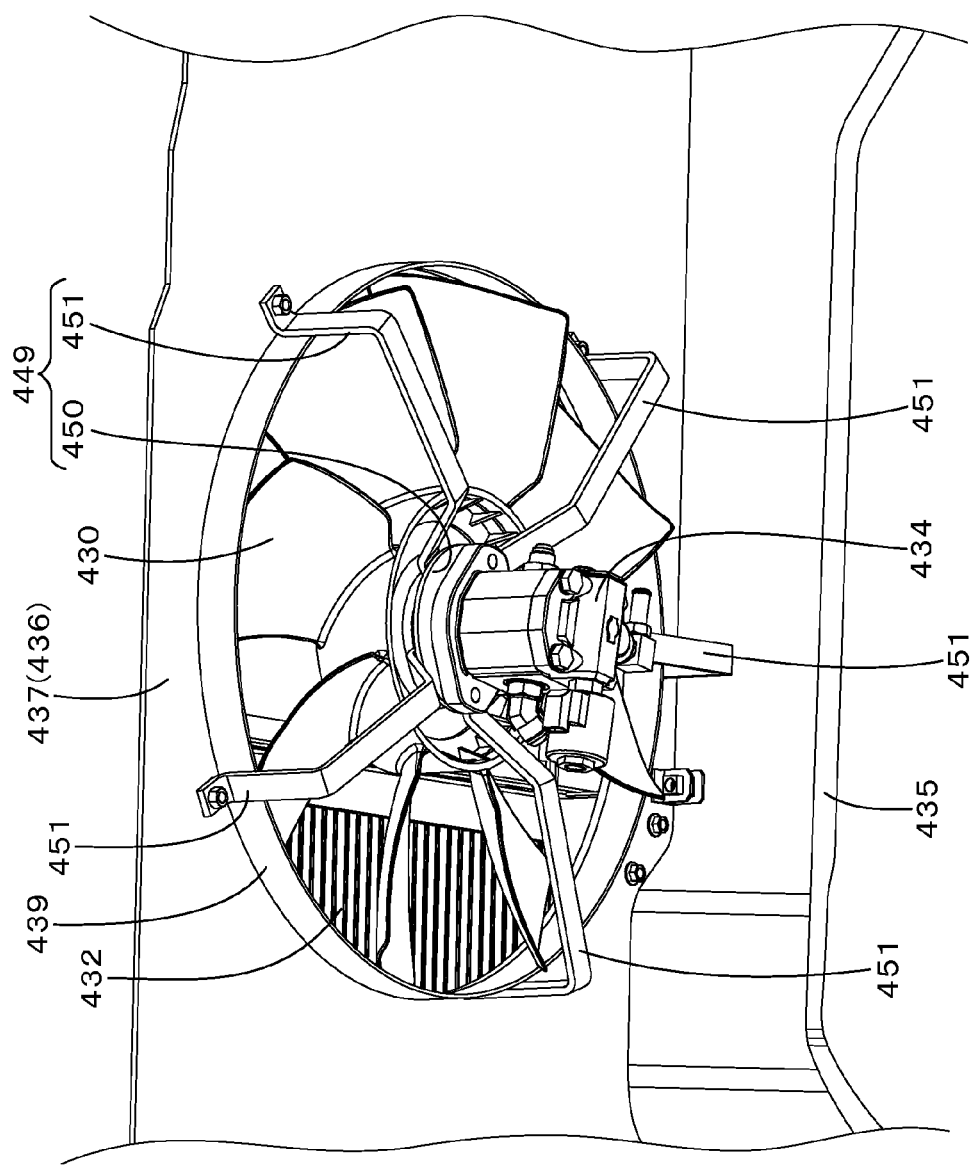
FIG. 5 is a perspective view of a fan, a fan motor, and a shroud according to the embodiment, seen upward from behind the working machine.

As shown in FIG. 5, the fan motor 434 is supported by a support member 449 at a lower portion of the fan motor 434. The support member 449 includes an attachment portion 450 and a plurality of support stays 451. The attachment portion 450 is a portion for attachment of the fan motor 434, the attachment portion 450 having a circular shape. Each of the support stays 451 is connected to the attachment portion 450 to be extended radially centering the attachment portion 450. Each of the support stays 451 is fixed to the attachment portion 450 at one end of the support stay 451, and is fixed to a shroud 436 at the other end of the support stay 451, the shroud 436 being disposed on a circumferential portion (peripheral portion) of the fan 430.

The number of the support stays 451 is not limited to a specific number. However, it is preferred to determine the number of the support stays 451 as small as possible for the purpose of easy access to the fan 430 and the like from below and behind, satisfying an ability to support the fan motor 434. For example, the number is determined to five or less (the five support stays 451 are shown in the example of the drawings). In addition, as shown in FIG. 5, it is preferred for the support stays 451 adjacent to each other, the support stays 451 being fixed to a rear side of the attachment portion 450, to form an interval larger than intervals between the other support stays 451, thereby allowing easy access from behind the steer skid loader 1.

According to the above described configurations for supporting the fan motor 434, the fan 430 can be easily accessed from below (from the side of the fan motor 434), and the cooling unit C also can be easily accessed through an air vent hole described below, the cooling unit C being disposed on an upper stream side of the fan 430. In this manner, the configurations for supporting the fan motor 434 allows good working efficiency in the maintenance of the fan 430, the fan motor 434, and the cooling unit C.

As shown in FIG. 1 to FIG. 5, the shroud 436 includes a plate portion 437 and a standing portion 438. A left end of the machine body 2 is connected to the support wall 229a disposed on the left side of the machine body 2. A right end of the plate member 437 is connected to the support wall 229a disposed on the right side of the machine body 2. The plate portion 437 constitutes an upper surface of the duct 435.

The plate portion 437 includes two rim portions 439 and 440, each of the rim portions 439 and 440 forming a hole. The rim portion 439 includes a circular frame forming the air vent hole, the air vent hole being used for passage of the air flow generated by the fan 430. Hereinafter, the rim portion 439 is referred to as a first rim portion 439. The first rim portion 439 is disposed approximately in the center of the plate portion 437. The other end of the support stay 451 is fixed near the first rim portion 439.

As shown in FIG. 7, the rim portion 440 forms a through hole vertically penetrating the plate portion 437, the rim portion 440 being disposed on a right side of the condenser 433. The rim portion 440 has an elliptic shape, the elliptic shape extending along a right side surface of the condenser 433 in the front to rear direction (or the rear to front direction). A hose 441 extending to the condenser 433 passes through the rim portion 440. In particular, the hose 441 passes through the rim portion 440 from below of the condenser 433, and extends to reach an upper portion (the plate portion 437) where the condenser 433 is arranged. The hose 441 is a hose for supplying the cooling medium (refrigerant) of the air conditioner to the condenser 433 and for retrieving the condensed cooling medium from the condenser 433.

Figure 6:
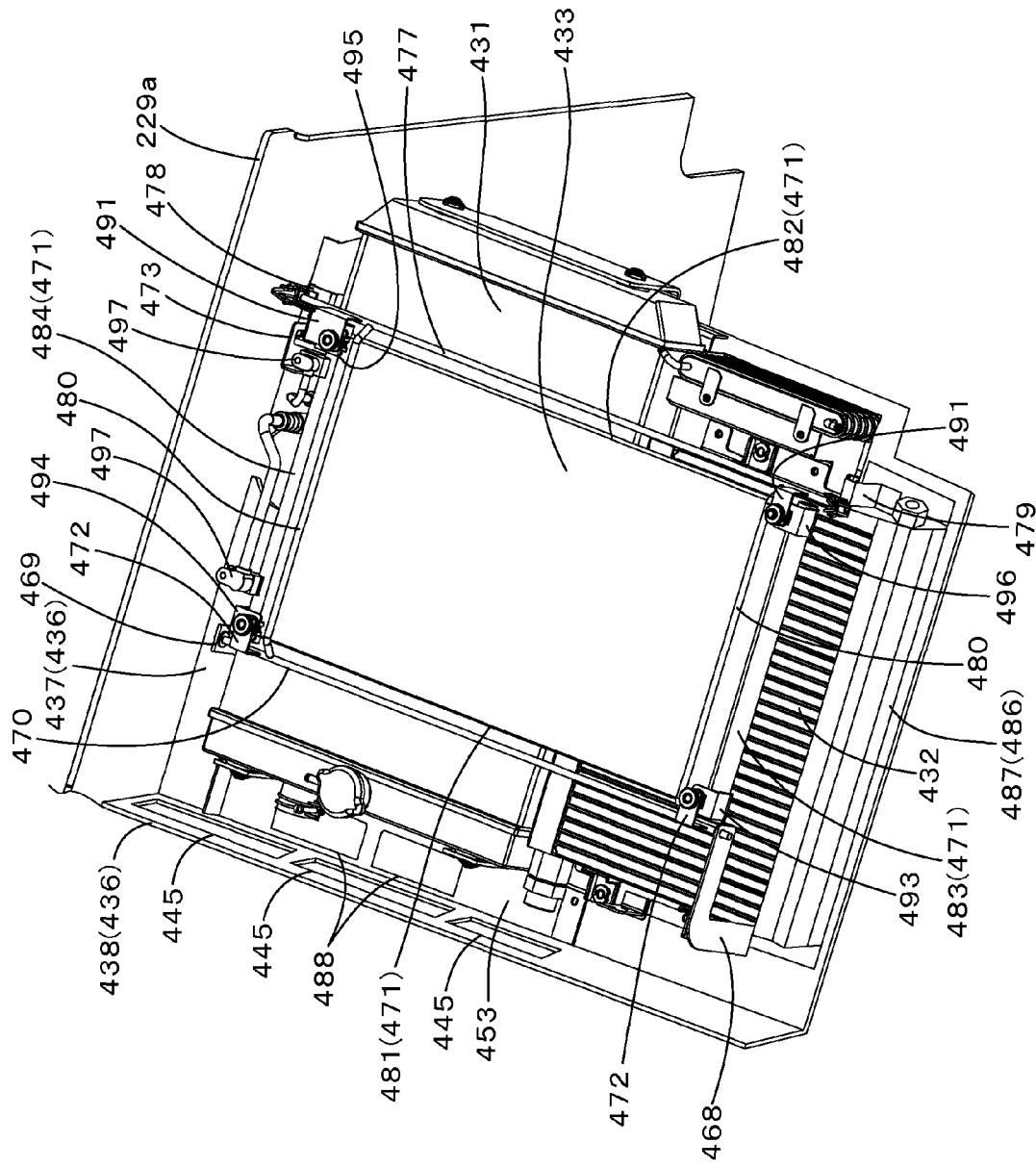
FIG. 6 is a perspective view of an area around the cooling unit according to the embodiment, seen downward and diagonally-rightward from behind the working machine.

As shown in FIG. 2, FIG. 6, and FIG. 8, the standing portion 438 stands up upward from a front portion of a circumferential portion of the plate member 437.

The standing portion 438 stands in front of the cooling unit C (the radiator 431, the oil cooler 432, and the condenser 433). A front portion of the cooling unit C is disposed in rear of the standing portion 438. In addition, as shown in FIG. 6 and FIG. 8, the standing portion 438 includes a fourth rim portion (an opening rim portion) 445 having a circular shape, the fourth rim portion 445 forming an air inlet for taking the air. The air inlet is disposed for taking the air heated in the engine room 442 to send the heated air into the duct 435, as described below in detail.

As shown in FIG. 1, the duct 435 includes a main body portion 446 and a cover 448. The cover 448 is attached to the main body portion 446 as described below, the cover 448 being configured to be attached to and detached from the main body portion 446.

The main body portion 446 covers front portions, rear portions, and lower portions of the fan 430 and the fan motor 434 with the cover 448 attached to the main body portion 446. The plate portion 437 is arranged above the fan motor 434. The duct 435 is constituted of the main body portion 446, the cover 448, and the plate portion 437.

In particular, the main body portion 446 constitutes a front surface, a rear surface, and a lower surface of the duct 435 with the cover 448 attached to the main body portion 446, and the plate portion 437 constitutes an upper surface of the duct 435.

Figure 3:
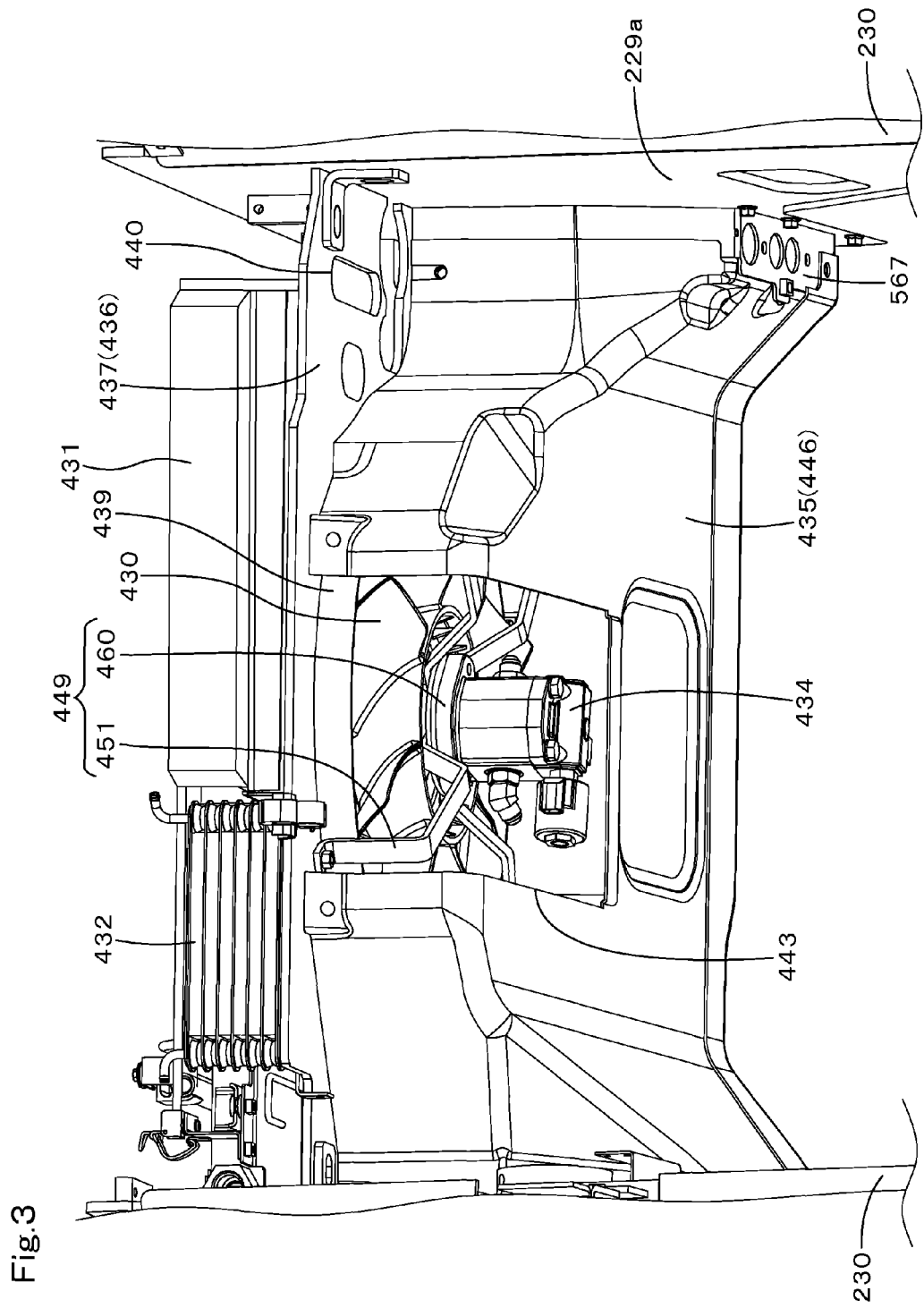
FIG. 3 is a perspective view of an area around a duct according to the embodiment, seen upward from behind the working machine.

As shown in FIG. 3, a second rim portion 443 is formed on a portion opposite to the bonnet 530, that is, on a rear portion of the main body portion 446, the second rim portion 443 forming an access hole. The second rim portion 443 is disposed extending from a rear surface of the main body portion 446 to a lower surface of the main body portion 446. In particular, the second rim portion 443 forms the access hole, the access hole extending from an upper end portion of the rear surface of the main body portion 446 to a lower end portion of the rear surface, continuing from the lower end portion to the lower surface of the main body portion 446, and further extending forward on the lower surface.

As shown in FIG. 3, in view of the easy maintenance, it is preferred for the second rim portion 443 to be disposed at a portion where at least the whole of the fan motor 434 and the attachment portion 450, and the fan 430, the first rim portion 439, and the support stay 451 arranged around the fan motor 434 and the attachment portion 450 can be visible from outside through the access hole.

The cover 448 is attached to the second rim portion 443, the cover 448 being configured to be freely attached to and detached from the second rim portion 443, thereby covering the access hole from outside. FIG. 1 shows a state where the cover 448 is attached to the second rim portion 443. FIG. 3 shows a state where the cover 448 is detached from the second rim portion 443.

As shown in FIG. 3, when the cover 448 is detached from the main body portion 446, the access hole is opened, and then the inside of the duct 435 can be accessed from back and below. In this manner, the fan 430 and the fan motor 434 can be easily maintained, and the inside of the duct 435 can be easily cleaned. In addition, when a high pressure air is injected upward from the access hole, the high pressure air passes through the air vent hole formed on the plate portion 437, the plate portion 437 constituting the upper surface of the duct 435, and reaches the lower surfaces of the radiator 431 and the oil cooler 432. Thus, the radiator 431 and the oil cooler 432 can be easily cleaned routinely, thereby reducing the clogging of the radiator 431 and the oil cooler 432.

Figure 4:
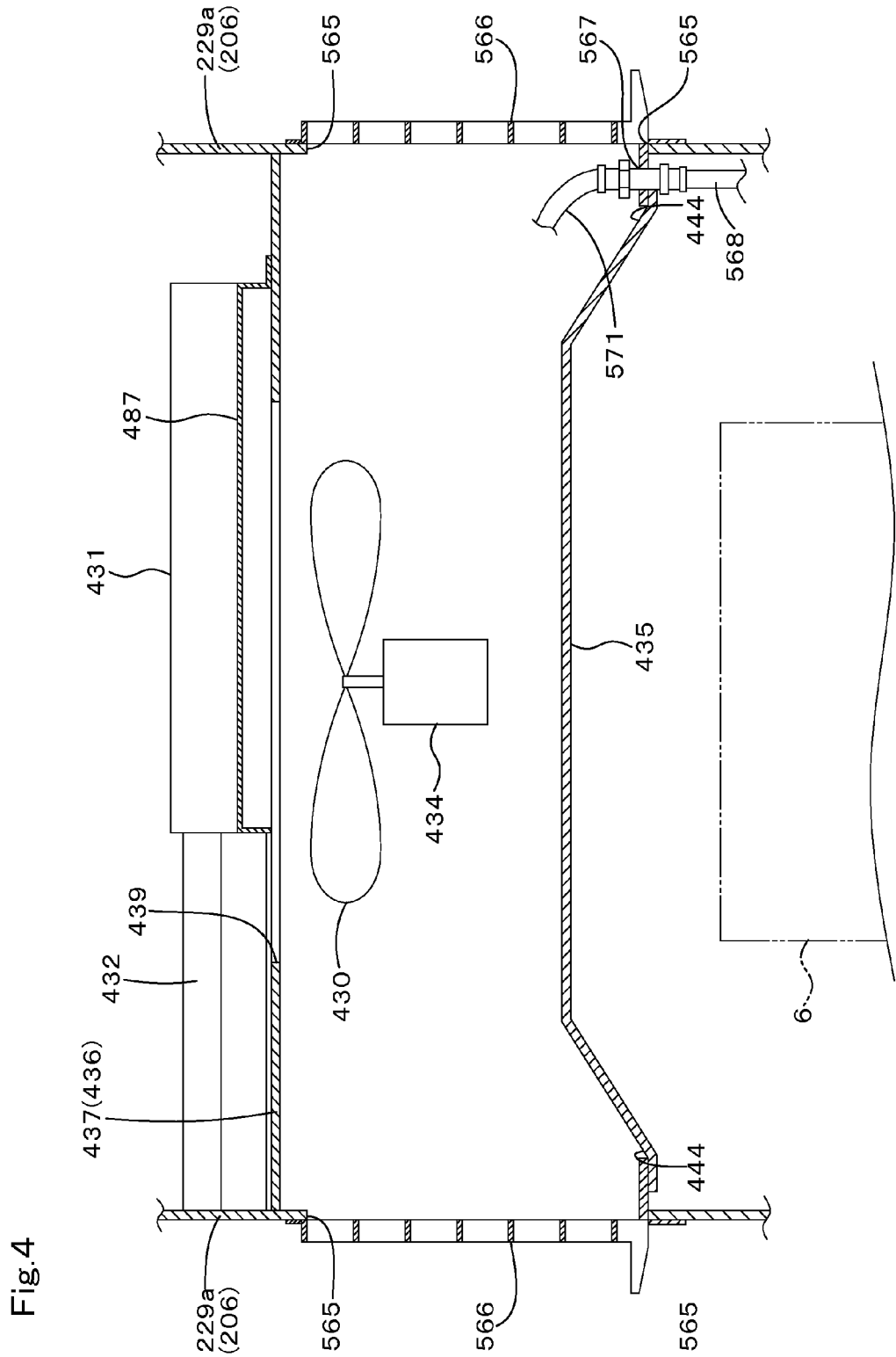
FIG. 4 is a schematic back cross-sectional view of the area around the duct according to the embodiment.

As shown in FIG. 4, a right end portion of the duct 435 is connected to the support wall 229a, the support wall 229a being placed on the right side of the machine body 2. A left end portion of the duct 435 is connected to the support wall 229a, the support wall 229a being placed on the left side of the machine body 2. The duct 435 is radially enlarged downward to be closed to the side portion. And thus, the duct 435 has a vertical cross sectional area enlarged downward. A third rim portion 444 is formed on a side end portion of the duct 435, that is, on a right end portion and a left end portion of the duct 435, the third rim portion 444 forming an opening portion. The opening portion exhausts the air from the duct 435, the air being taken into the duct 435 by driving the fan 430 through the air vent hole disposed on the plate portion 437.

The support wall 229a includes an exhaust opening for exhausting the air being in the duct 435 toward the outside of the machine body 2. As shown in FIG. 4 and FIG. 8, the exhaust opening is formed of a circular rim portion 565 (hereinafter referred to as a fifth rim portion 565), being surrounded by the circular rim portion 565. A frame member 566 is attached to the fifth rim portion 565, the frame member 566 having a grille. The third rim portion 444 is disposed near the fifth rim portion 565, the third rim portion 444 forming an opening portion of the duct 435. In this manner, the air being in the duct 435 is exhausted from the exhaust opening toward the outside of the machine body 2.

As shown in FIG. 4, a relay portion 567 of a hydraulic hose in disposed on the fifth rim portion 565, the fifth rim portion 565 being formed on the support wall 229a of the support frame 206 disposed on the right side. The relay portion 567 includes a pipe joint for jointing at least two hoses to each other. Two of first hydraulic hoses 571 are connected to the relay portion 567, the first hydraulic hoses 571 passing through the third rim portion 444 of the duct 435 and being withdrawn from the duct 435. In addition, two of second hydraulic hoses 568 are connected to the relay portion 567, the second hydraulic hoses 568 being disposed in the engine room 442.

Of two first hydraulic hoses 571, one of the first hydraulic hoses 571 (referred to as a supply hose) supplies a hydraulic operation fluid to the fan motor 434, and the other one of the first hydraulic hoses 571 (referred to as an exhaust hose) exhausts the hydraulic operation fluid from the fan motor 435.

One end of the supply hose is connected to an oil filler port of the fan motor 434, the one end being an end portion disposed on an entry side of the duct 435 (on an inner side of the duct 435), and the other end of the supply hose is connected to the relay portion 567. One end of the exhaust hose is connected to an exhaust port of the fan motor 434, and the other end of the discharge port is connected to the relay portion 567.

Of two second hydraulic hoses 568, one of the second hydraulic hoses 568 is connected to the relay portion 567 at one end portion of the second hydraulic hose 568, and is connected to a discharge port of a hydraulic pump (not shown in the drawings) at the other end of the second hydraulic hose 568. Of two second hydraulic hoses 568, the other one of the second hydraulic hoses 568 is connected to the relay portion 567 at one end portion of the second hydraulic hose 568, and is connected to an intake port of the hydraulic pump (not shown in the drawings) through the oil filter (not shown in the drawings) at the other end portion of the second hydraulic hose 568.

Considering the fan motor 434 arranged in the duct 435, the duct 435 has to have a hole for insertion of the hydraulic hose, the hydraulic hose being configured to supply the hydraulic operation fluid to the fan motor 434, in order to connect the hydraulic hose to the fan motor from the outside of the duct 435. However, the above-described configuration requires a structure for sealing a gap between the hydraulic hose and the hole, the structure being configured to prevent the heated air in the duct 435 from leaking from the gap to flow into the engine room 442. Thus, the configuration requires a large number of the parts. In the embodiment, since the above-described relay portion 567 is disposed, the hydraulic hose can be connected to the fan motor 434 from the outside of the duct 435 without forming a hole on the duct 435. Thus, the present invention does not need the sealing structure, thereby reducing the number of parts.

As shown in FIG. 2, FIG. 6, and FIG. 7, guide members 452 and 453 are disposed between the standing portion 438 and a front portion of the radiator 431, the guide members 452 and 453 being configured to guide the air taken through the fourth rim portion 445. The guide member includes a first guide portion 452 and a second guide portion 453.

The first guide portion 452 is arranged above the fourth rim portion 445 and on a position higher than an upper end of the standing portion 438. As shown in FIG. 7 and FIG. 9, the first guide portion 452 is constituted of the upper plate portion 234, the upper plate portion 234 supporting a rear portion of the cabin 3. The upper plate portion 234 extends in the machine width direction K to cover the standing portion 438 from above, covering over from a left end of the standing portion 438 to a right end of the standing portion 438, and extends in the front to rear direction, extending from a portion in front of the standing portion 438 to a portion in rear of the standing portion 438.

Figure 12:
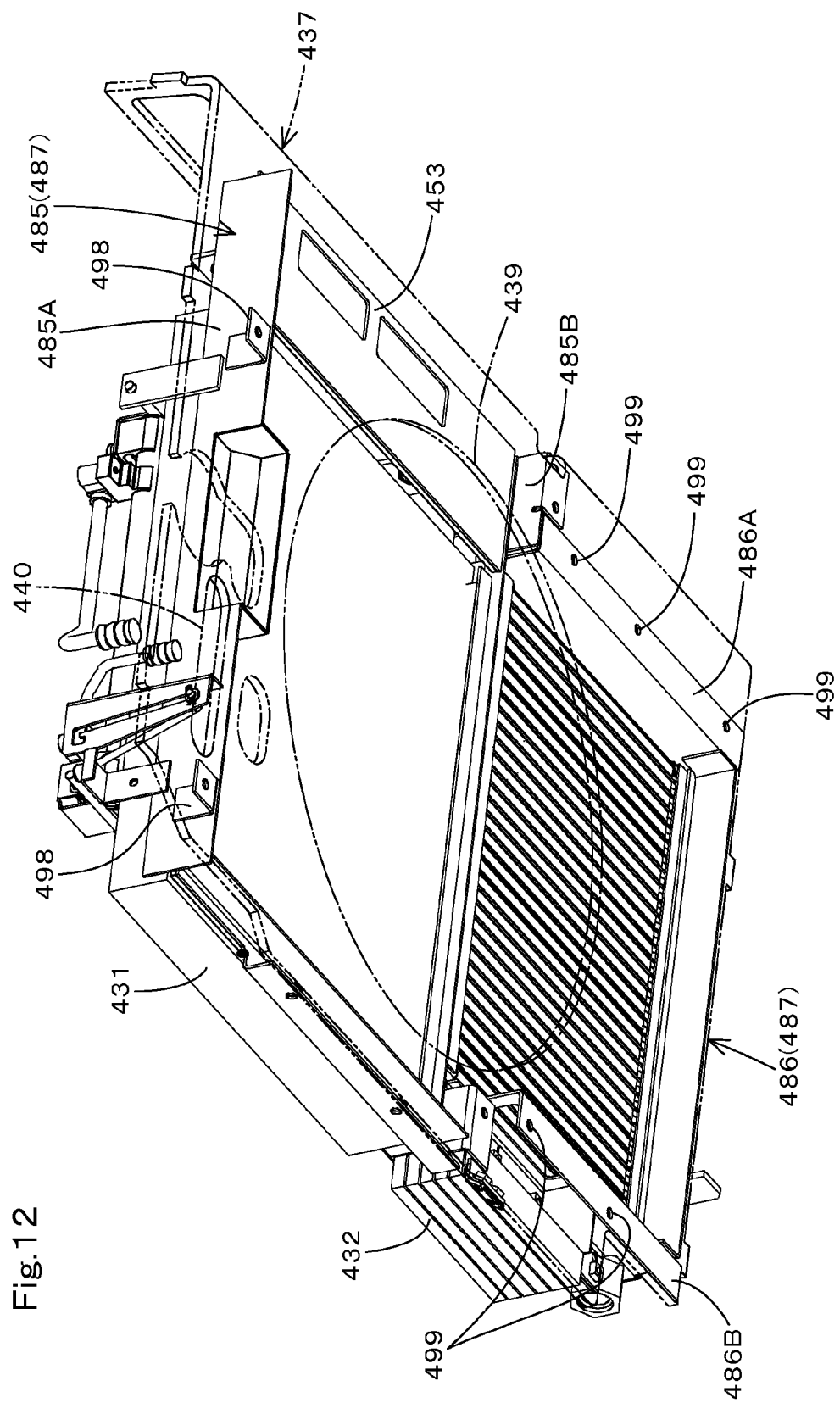
FIG. 12 is a perspective view of the cooling unit according to the embodiment, seen upward and diagonally-leftward.

As shown in FIG. 2 and FIG. 6, the second guide portion 453 is arranged below the fourth rim portion 445. As shown in FIG. 12, the second guide portion 453 is a plate portion in one body with a support member 487, the support member 487 being configured to support the radiator 431 and the oil cooler 432. The second guide portion 453 is disposed in front of and below the radiator 431. The second guide portion 453 extends forward and toward the standing portion 438, and includes a through hole 488 vertically penetrating the second guide portion 453.

As shown by an arrowed line in FIG. 2, the air heated in the engine room 442 (the heated air) flows upward passing through between a front surface of the duct 435 and a front plate portion 235 of the front frame 232, and then the heated air flows backward along a lower surface of the upper plate portion 234 to be taken into a front of the radiator 431 from the air inlet formed by the fourth rim portion 445 of the standing portion 438. The taken heated air is introduced into the duct 435 by the air flow, the air flow formed by the fan 430, and is exhausted to the outside of the machine body 2 through the exhaust opening formed in the support wall 229*a*. In this manner, the heated air does not stay in the engine room 442, and thereby a temperature in the engine room 442 is reduced to improve the heat balance performance.

As shown in FIG. 2, a bonnet upper cover 570 is disposed in front of the bonnet 530 and above the condenser 433. As shown in FIG. 9, the bonnet upper cover 570 has many opening portions, each of the opening portions having a slit shape. The opening portions can release the heated air from the opening portion of the bonnet upper cover 570 to the outside of the machine body 2 even when the engine 6 stops (the fan 430 stops), the heated air being taken into the air inlet.

Next, an arrangement structure of the cooling unit C will be described.

As shown in FIG. 1 and in other drawings, the radiator 431 and the oil cooler 432 are arranged above the fan 430. The condenser 433 is arranged above the radiator 431 and the oil cooler 432. The radiator 431 and the oil cooler 432 is arranged in parallel adjacent to each other. In particular, as shown in FIG. 6, the radiator 431 is arranged on the right side, and the oil cooler 432 is arranged on the left side.

Considering a conventional structure where the radiator, the oil cooler, and the condenser are arranged in the order of description from below above the fan, the air heated passing through the condenser and the oil cooler is used for cooling the radiator, thereby degrading the heat exchange efficiency of the radiator. In addition, the air flowing toward the radiator is blocked when only one of the condenser and the oil cooler is clogged up, and accordingly the heat exchange efficiency of the radiator is further degraded. On the other hand, the embodiment of the present invention has a structure where: the radiator 431 and the oil cooler 432 is arranged in parallel above the fan 430; and the condenser 433 is arranged above the radiator 431 and the oil cooler 432. Accordingly, the air of relatively-low temperature is used for cooling the radiator 431, the air not passing through the oil cooler 432, thereby improving the heat exchange efficiency of the radiator 431. In addition, since the air not passing through the oil cooler 432 can be introduced to the radiator 431, the degradation of the heat exchange efficiency of the radiator 431 can be suppressed, the degradation of the heat exchange efficiency being caused by the clogging up of the oil cooler 432.

As shown in FIG. 6, FIG. 7, and FIG. 12, the radiator 431 and the oil cooler 432 are supported by the support member 487. The support member 487 includes a radiator support portion 485 and an oil cooler support portion 486. The radiator support portion 485 is a support portion disposed to surround a circumferential portion of the radiator 431. The oil cooler support portion 486 is a support portion disposed to surround a circumferential portion of the oil cooler 432. The support member 487 is placed on an upper portion of the shroud 436, specifically, on an upper surface of the plate portion 437 of the shroud 436.

As shown in FIG. 12, the radiator support portion 485 includes a right portion 485A and a left portion 485B.

The right portion 485A is a support member disposed on a right side of the radiator 431, the right portion 485A being configured to support a right portion of the radiator 431. The right portion 485A includes: a bracket 498 disposed on a front portion of the right portion 485A; and a bracket 498 disposed on a rear portion of the right portion 485A. The bracket 498 disposed on the front portion is fixed to an upper surface of the plate portion 437, and the bracket 498 disposed on the rear portion is also fixed to the upper surface of the plate portion 437.

The left portion 485B is a support member disposed on a left side of the radiator 431, the left portion 485B being configured to support a left portion of the radiator 431. The left portion 485B is fixed to the upper surface of the plate portion 437. The right portion 485A and the left portion 485B support the radiator 431, the radiator 431 being supported floating above from the plate portion 437.

As shown in FIG. 12, the oil cooler support portion 486 includes the front portion 486A and the rear portion 486B. The front portion 486A is a support member disposed on a front side of the oil cooler 432, the front portion 486A being configured to support a front portion of the oil cooler 432. The front portion 486A is fixed to the upper surface of the palate portion 437. The rear portion 486B is a support member disposed on a rear side of the oil cooler 432, the rear portion 486B being configured to support a rear portion of the oil cooler 432. The rear portion 486B is fixed to the upper surface of the palate portion 437. The front portion 486A and the rear portion 486B support the oil cooler 432, the oil cooler 432 being supported floating above from the plate portion 437. In this manner, the radiator support portion 485 is supported on the right portion of the plate portion 437, and the oil cooler 432 is supported on the left portion of the plate portion 437.

The condenser 433 is supported above the radiator 431 and the oil cooler 432 by a stay member 467.

Figure 10:
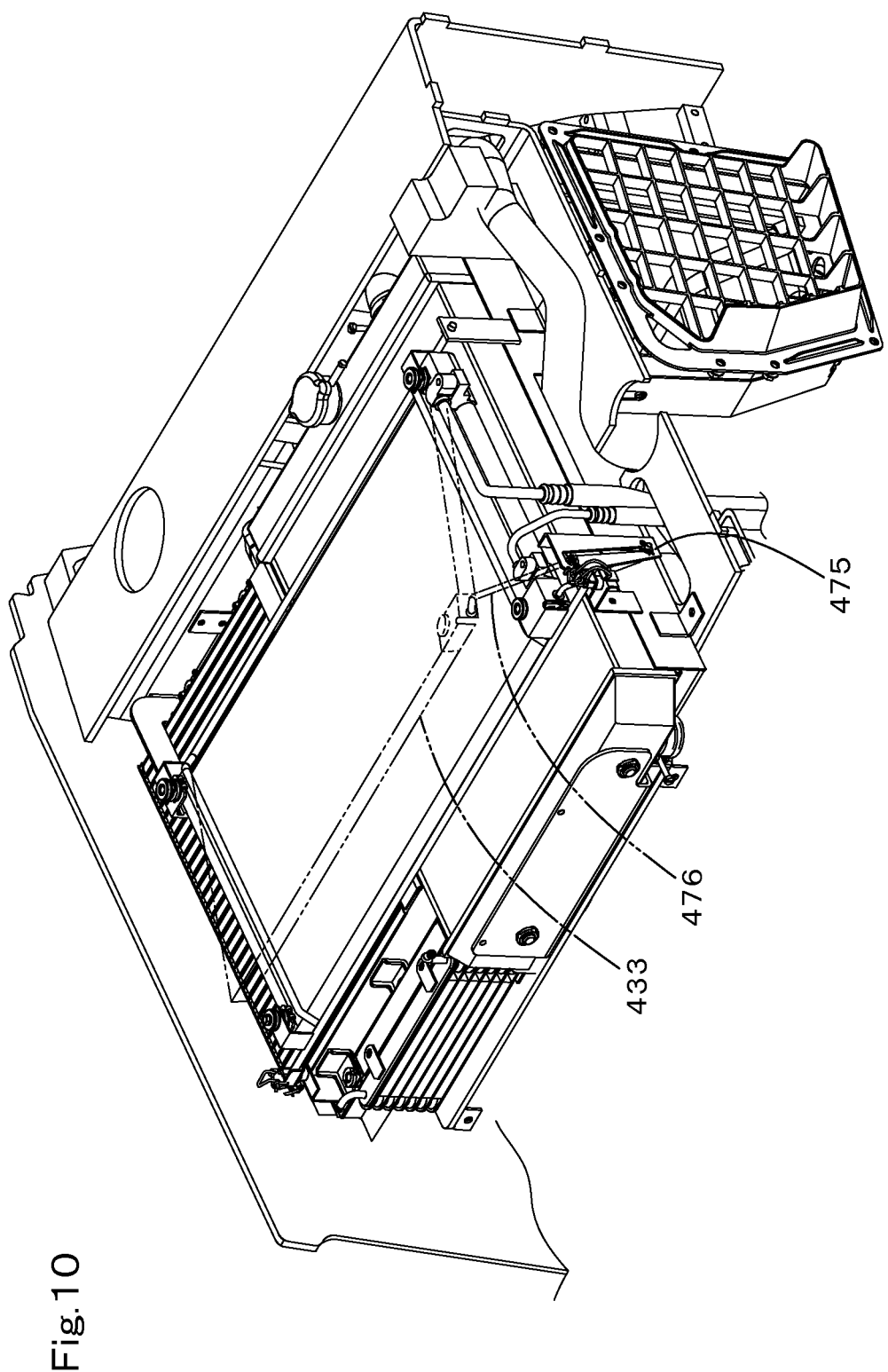
FIG. 10 is a schematic view showing a state where the condenser is tilted up, using a two-dot chain line virtually showing the condenser tilted up.

As shown in FIG. 7, the stay member 467 is capable of moving the condenser 433 from a normal position to a tilted-up position, the normal position being a position where the condenser 433 is arranged in parallel to the upper surfaces of the radiator 431 and the oil cooler 432, the tilted-up position being a position where the condenser 433 is tilted upward from the upper surfaces of the radiator 431 and the oil cooler 432 as shown in FIG. 10, and the stay member 467 is capable of staying the condenser 433 at the tilted-up position.

As shown in FIG. 6 and FIG. 7, the stay member 467 includes a first bracket 468, a second bracket 469, a third bracket 478, a fourth bracket 479, a first shaft portion 470, a second shaft portion 477, a frame body 471, a first joint portion 472, a second joint portion 491, and a stay portion 473.

The first bracket 468 is fixed to a front portion of the oil cooler support portion 486, being near a left side of the front portion, at one end of the first bracket 468, and the other end of the first bracket 468 is extended to the front side of the condenser 433 on the left side thereof. The second bracket 469 is fixed to a side portion (a right portion) of the radiator support portion 485, being near a front side of the radiator support portion 485, at one end of the second bracket 469, and the other end of the second bracket 469 is extended to a side (a right side) of the condenser 433, being near a front side of the condenser 433.

The first shaft portion 470 bridges over between the other and of the first bracket 468 and the other end of the second bracket 469.

The third bracket 478 is fixed to a side portion (a right portion) of the radiator support portion 485, being near a rear side of the radiator support portion 485, at one end of the third bracket 478, and the other end of the third bracket 478 is extended to the side (the right side) of the condenser 433, being near a rear side of the condenser 433. The fourth bracket 479 is fixed to a rear portion of the oil cooler support portion 486, being near a left side of the rear portion, at one end of the fourth bracket 479, and the other end of the fourth bracket 479 is extended to the rear side of the condenser 433 on the left side thereof.

The second shaft portion 477 bridges over between the other and of the third bracket 478 and the other end of the fourth bracket 479.

The first shaft portion 470 is attached to the first bracket 468 and to the second bracket 469, and is capable of freely turning on the first bracket 468 and the second bracket 469. The second shaft portion 477 is attached to the third bracket 478 and to the fourth bracket 479, and is capable of freely attached to and detached from the third bracket 478 and the fourth bracket 479. A joint member 480 joints the left portion of the first shaft portion 470 to the left portion of the second shat portion 477. Another joint member 480 joints the right portion of the first shaft portion 470 to the right portion of the second shat portion 477. In this manner, when the first shaft portion 470 is turned to tilt up the condenser 433, the tilting up of the condenser 433 detaches the second shaft portion 477 from the third bracket 478 and the fourth bracket 479, and then the second shaft portion 477 is lifted together with the condenser 433.

The frame body 471 is a frame having a rectangular shape when seen from above, and holds a circumference (an outside surface) of the condenser 433. The frame body 471 includes a front frame portion 481, a rear frame portion 482, a left frame portion 483, and a right frame portion 484. The front frame portion 481 extends along a front circumference portion of the condenser 433. The rear frame portion 482 extends along a rear circumference portion of the condenser 433. The left frame portion 483 extends along a left portion of the condenser 433. The right frame portion 484 extends along a right portion of the condenser 433. A hose attachment tool 497 is attached to the right frame portion 484, the hose attachment tool 497 being configured to attach the hose 441 to the right frame portion 484.

The first joint portion 472 is connected to a right portion of the first shaft portion 470. The other first joint portion 472 is connected to a left portion of the first shaft portion 470. The first joint portion 472 connected to the left portion of the first shaft portion 470 is attached to a front portion of the left frame portion 483 of the frame body 471, interposing a first attachment tool 493. The first joint portion 472 connected to the right portion of the first shaft portion 470 is attached to a front portion of the right frame portion 484 of the frame body 471, interposing a second attachment tool 494.

The second joint portion 491 is connected to a right portion of the second shaft portion 477. The other second joint portion 491 is connected to a left portion of the second shaft portion 477. The second joint portion 491 connected to the right portion of the second shaft portion 477 is attached to a rear portion of the right frame portion 484 of the frame body 471, interposing a third attachment tool 495. The second joint portion 491 connected to the left portion of the second shaft portion 477 is attached to a rear portion of the left frame portion 483 of the frame body 471, interposing a fourth attachment tool 496.

The front frame portion 481 of the frame body 471 turns upward centering about the first shaft portion 470 together with the first joint portion 472, the front frame portion 481 supporting the condenser 433, when the first joint portion 472 turns centering about the first shaft portion 470. Then, the rear frame portion 482 is lifted up by the turning of the first joint portion 472. In this manner, the condenser 433 moves from the normal position to the tilted-up position.

As shown in FIG. 7 and FIG. 11, the stay portion 473 includes a stay piece 475 and a stay rod 476.

The stay piece 475 is fixed to the support member 487 at a lower end portion of the stay piece 475, and an upper end portion of the stay piece 475 is positioned on a side (a left side) of the frame body 471, being near a front side of the frame body 471. The stay piece 475 has a slit hole 474 extending vertically. A bent portion 490 is disposed on an upper portion of the slit hole 474, the bent portion 490 extending backward from an upper end portion of the slit hole 474 and bending downward.

An upper end portion of the stay rod 476 is fixed to a side portion (a right portion) of the second joint portion 491, the second joint portion 491 being attached to a rear portion of the right frame portion 484. A lower end portion of the stay rod 476 is engaged into the slit hole 474 of the stay piece 475, and is capable of vertically moving (sliding) along the slit hole 474.

As shown in an upper drawing of FIG. 11, a lower end portion 476A of the stay rod 476 is positioned at a lower end portion of the slit hole 474 when the condenser 433 is at the normal position. The lower end portion 476A of the stay rod 476 moves upward along the slit hole 474 when the condenser 433 is tilted up. As shown by a solid line in a lower drawing of FIG. 11, the lower end portion 476A of the stay rod 476 is positioned at the bent portion 490 of the slit hole 474 when the condenser 433 is at the tilted-up position. In this manner, the condenser 433 is held at the tilted-up position as vertically shown by a two-dot chain line in FIG. 10.

As described above, the condenser 433 can be moved from the normal position to the tilted-up position and can be held at the tilted-up position, and thus it is possible to clean: the upper surfaces of the radiator 431 and the oil cooler 432; and the lower surface of the condenser 433, thereby reducing the clogging up of the radiator 431 and the oil cooler 432.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
a machine body;
a motor mounted on the machine body;
a fan arranged above the motor, the fan being configured to generate an air flow downward;
a radiator arranged above the fan and on one side of the machine body in a machine width direction;
an oil cooler arranged adjacent to the radiator and on the other side of the machine body in the machine width direction;
a condenser arranged above the radiator and the oil cooler; and
a stay member being configured to stay the condenser at a tilted-up position where the condenser is tilted upward from upper surfaces of the radiator and the oil cooler,
the stay member includes:
a first bracket disposed around the condenser;
a second bracket disposed around the condenser, the second bracket being different from the first bracket;
a shaft portion disposed between the first bracket and the second bracket;
a frame body configured to support the condenser;
a joint portion attached to a front portion side of the frame body and connected to the shaft portion; and
a stay portion configured to stay the condenser at the tilted-up position, the condenser being tilted by the joint portion turned about the shaft portion.

2. The working machine according to claim 1, further comprising a shroud disposed around the fan, wherein
the first bracket is disposed on a front portion of the shroud in front of the condenser,
the second bracket is disposed on a side portion of the shroud, the side portion being on a side of the condenser, and
the stay portion is disposed on a side portion of the shroud, the side portion being in rear of the second bracket.

3. A working machine comprising:
a machine body;
a motor mounted on the machine body;
a fan arranged above the motor, the fan being configured to generate an air flow downward;
a radiator arranged above the fan and on one side of the machine body in a machine width direction;
an oil cooler arranged adjacent to the radiator and on the other side of the machine body in the machine width direction;
a condenser arranged above the radiator and the oil cooler;
a hose connected to the condenser; and
a shroud disposed around the fan, wherein
the shroud includes:
a rim portion forming a through hole on a side of the condenser, the through hole vertically penetrating the shroud, and
the hose is disposed passing through the rim portion from below of the condenser and extending to reach an upper portion where the condenser is arranged.

4. A working machine comprising:
a motor;
a fan disposed above the motor;
a fan motor configured to drive the fan;
a shroud disposed around the fan, the shroud including:
a first rim portion forming an air vent hole, the air vent hole serving as a passage of an air flow generated by the fan;
a support member configured to support the fan motor from below, the support member including:
an attachment portion being a portion for attachment of the fan motor; and
a support stay extending from the attachment portion toward the shroud and being fixed at an end portion of the support stay, the end portion being disposed opposite to the attachment portion;
a duct connected to the shroud, the duct being configured to introduce air passing through the air vent hole, the duct including
a second rim portion forming an access hole, the second rim portion being disposed on a rear portion of the duct; and
a bonnet disposed to cover a rear portion of the motor, the bonnet being configured to be freely opened and closed.

5. The working machine according to claim 4, wherein the duct includes:

a cover configured to cover the access hole from an outside, the cover being configured to be freely attached to and detached from the access hole; and a third rim portion forming an opening portion, the opening portion being configured to exhaust the air to the outside.

6. The working machine according to claim 5, wherein the fan motor is constituted of a hydraulic motor, the hydraulic motor being configured to be driven by a hydraulic operation fluid.

7. The working machine according to claim 6, comprising:

a first hydraulic hose configured to supply the hydraulic operation fluid to the hydraulic motor, the hydraulic hose passing through the third rim portion and entering the duct; and a relay portion configured to connect an end portion of the hydraulic hose to a second hydraulic hose other than the first hydraulic hose, the end portion being disposed on a side opposite to another end portion entering the duct.

8. The working machine according to claim 7, wherein the relay portion is disposed on a side of the third rim portion.

9. The working machine according to claim 5, comprising a machine body, wherein one of the third rim portions is disposed on a right side of the machine body, and the other one of the third rim portions is disposed on a left side of the machine body.

10. The working machine according to claim 4, comprising:

a motor room configured to house the motor, wherein the shroud includes:

a plate portion having the first rim portion; and a standing portion standing upward from a circumference of the plate portion, and the standing portion includes:

an opening rim portion forming an air inlet, the air inlet being configured to take air from the motor room.

11. The working machine according to claim 10, comprising:

a radiator disposed in rear of the standing portion, the radiator having a circumference portion; and a guide member disposed between the standing portion and the circumference portion, the guide member being configured to guide the air, the air passing through the opening rim portion.

12. The working machine according to claim 11, wherein the guide member includes:

a first guide portion arranged above the opening rim portion and on a position higher than an upper end of the standing portion; and a second guide portion arranged below the opening rim portion.

* * * * *